(12) United States Patent
Lebrun et al.

(10) Patent No.: US 11,301,968 B1
(45) Date of Patent: Apr. 12, 2022

(54) SYSTEMS AND METHODS FOR REMOVING TRANSIENT ELEMENTS IN IMAGES

(71) Applicant: GoPro, Inc., San Mateo, CA (US)

(72) Inventors: Marc Lebrun, Issy-les-Moulineaux (FR); Maxim Karpushin, Paris (FR); Nicolas Rahmouni, San Mateo, CA (US)

(73) Assignee: GoPro, Inc., San Mateo, CA (US)

( * ) Notice: Subject to any disclaimer, the term of this patent is extended or adjusted under 35 U.S.C. 154(b) by 39 days.

(21) Appl. No.: 17/003,114

(22) Filed: Aug. 26, 2020

Related U.S. Application Data

(60) Provisional application No. 62/894,647, filed on Aug. 30, 2019.

(51) Int. Cl.
*G06T 5/00* (2006.01)
*G06T 3/40* (2006.01)
*G06T 3/00* (2006.01)

(52) U.S. Cl.
CPC ............ *G06T 5/005* (2013.01); *G06T 3/0068* (2013.01); *G06T 3/4038* (2013.01); *G06T 2207/10016* (2013.01)

(58) Field of Classification Search
CPC ..... G06T 5/005; G06T 3/0068; G06T 3/4038; G06T 2207/10016
See application file for complete search history.

(56) References Cited

U.S. PATENT DOCUMENTS

2021/0241422 A1* 8/2021 Burke, III ............... G06T 5/005

* cited by examiner

*Primary Examiner* — Chan S Park
*Assistant Examiner* — Daniel C Chang
(74) *Attorney, Agent, or Firm* — Esplin & Associates, PC

(57) ABSTRACT

Captured images of a scene may include depictions of objects moving within the scene. The portions of the images depicting the moving objects may be identified by aligning the images and analyzing the changes in pixel values of the aligned images. For the portion of the images depicting the moving objects, the pixels values may be replaced with mean, mode, and/or median values that approximate the value that would have been captured without the moving objects, and one or more image without the depiction of moving objects may be generated.

20 Claims, 8 Drawing Sheets image 300 output image 350

SYSTEMS AND METHODS FOR REMOVING TRANSIENT ELEMENTS IN IMAGES

FIELD

This disclosure relates to removing transient elements in images.

BACKGROUND

A user may wish to capture a pristine scene within images or videos. For example, a user may wish to capture a landscape shot while removing depiction of moving things (e.g., persons, vehicles) within the landscape shot. Manually removing depiction of moving things within images or videos may be difficult and/or time consuming.

SUMMARY

This disclosure relates to removing transient elements in images. Visual information and/or other information may be obtained. The visual information may define visual content of images captured by an image capture device at different moments. The visual content may include depictions of a scene captured at the different moments. The depictions of the scene may be defined by pixels of the images. The images may include a first image, a second image, a third image, and/or other images. The visual content of the first image may be captured at a first moment and may include a first depiction of the scene defined by pixels of the first image. The visual content of the second image may be captured at a second moment and may include a second depiction of the scene defined by pixels of the second image. The visual content of the third image may be captured at a third moment and may include a third depiction of the scene defined by pixels of the third image. The visual content of the images may be aligned such that the pixels of the images defining the depictions of the scene captured at the different moments are aligned. The aligned pixels of the images may include sets of corresponding pixels across the images that define depictions of same parts of the scene. The sets of corresponding pixels may include a first set of corresponding pixels across the first image, the second image, and the third image that define depictions of a first part the scene. The first set of corresponding pixels may include a first pixel of the first image, a second pixel of the second image, and a third pixel of the third image.

For a given image of the images, transient pixels may be identified based on changes between pixel values of individual sets of corresponding pixels and/or other information. The transient pixels may define depictions of one or more transient objects within the scene across the different moments. A first transient pixel may be identified based on changes between pixel values of the first pixel of the first image, the second pixel of the second image, and the third pixel of the third image, and/or other information. For the transient pixels, non-transient pixel values may be determined based on the pixel values of respective sets of corresponding pixels and/or other information. Visual content of one or more output images may be generated based on the non-transient pixel values such that the visual content of the output image(s) do not include the depictions of the one or more transient objects within the scene.

A system that removes transient elements in images may include one or more electronic storages, one or more processors, and/or other components. An electronic storage may store visual information, information relating to images, information relating to visual content, information relating to alignment of visual content, information relating to aligned pixels, information relating to corresponding pixels across images, information relating to transient pixels, information relating to non-transient pixel values, information relating to output image, and/or other information.

The processor(s) may be configured by machine-readable instructions. Executing the machine-readable instructions may cause the processor(s) to facilitate removing transient elements in images. The machine-readable instructions may include one or more computer program components. The computer program components may include one or more of a visual information component, an alignment component, a transient pixel component, a non-transient pixel value component, a generation component, and/or other computer program components.

The visual information component may be configured to obtain visual information and/or other information. The visual information may define visual content of images captured by an image capture device at different moments. The images may be captured during a capture duration by the image capture device. The visual content may include depictions of a scene captured at the different moments. The depictions of the scene may be defined by pixels of the images. For example, the images may include a first image, a second image, a third image, and/or other images. The visual content of the first image may be captured at a first moment and may include a first depiction of the scene defined by pixels of the first image. The visual content of the second image may be captured at a second moment and may include a second depiction of the scene defined by pixels of the second image. The visual content of the third image may be captured at a third moment and may include a third depiction of the scene defined by pixels of the third image. In some implementations, the images may be video frames of an input video and an output image may be a video frame of an output video.

In some implementations, the image capture device may experience rotational movement during the capture duration. The rotational movement may be caused by jittering of the image capture device during the capture duration. The rotational movement may be caused by panning of the image capture device during the capture duration. In some implementations, the images may be stitched to form a panoramic image.

In some implementations, the image capture device may experience translational movement during the capture duration. The translational movement may be caused by translational displacement of the image capture device during the capture duration.

The alignment component may be configured to align the visual content of the images. The visual content of the images may be aligned such that the pixels of the images defining the depictions of the scene captured at the different moments are aligned. The aligned pixels of the images may include sets of corresponding pixels across the images that define depictions of same parts of the scene. For example, the sets of corresponding pixels may include a first set of corresponding pixels across the first image, the second image, and the third image that define depictions of a first part the scene. The first set of corresponding pixels may include a first pixel of the first image, a second pixel of the second image, and a third pixel of the third image.

In some implementations, aligning the visual content of the images may include aligning overlapping portions of the visual content of the images. For example, for images captured by the image capture device that experienced rotational movement during the capture duration, a lateral portion of the visual content of the first image may overlap with an opposing lateral portion of the visual content of the second image. For images captured by the image capture device that experience translational movement during the capture duration, a center portion of the visual content of the first image may overlap with a center portion of the visual content of the second image. The center portion of the visual content of the first image may be smaller than the center portion of the visual content of the second image, and the center portion of the visual content of the first image and/or the center portion of the visual content of the second image may be warped to compensate for the center portion of the visual content of the first image being smaller than the center portion of the visual content of the second image.

The transient pixel component may be configured to identify, for a given image of the images, transient pixels based on changes between pixel values of individual sets of corresponding pixels and/or other information. For example, a first transient pixel may be identified based on changes between pixel values of the first pixel of the first image, the second pixel of the second image, and the third pixel of the third image, and/or other information. The transient pixels may define depictions of one or more transient objects within the scene across the different moments.

In some implementations, identification of the transient pixels based on the changes between the pixel values of the individual sets of corresponding pixels may include identification based on the changes between pixel values of individual sets of corresponding pixels exceeding a threshold value, and/or other information. For example, identification of the transient pixels based on the changes between the pixel values of the individual sets of corresponding pixels may include identification of the first transient pixel based on the changes between pixel values of the first pixel of the first image, the second pixel of the second image, and the third pixel of the third image exceeding a threshold value, and/or other information.

The non-transient pixel value component may be configured to determine, for the transient pixels, non-transient pixel values based on the pixel values of respective sets of corresponding pixels and/or other information. In some implementations, the non-transient pixel values may be determined as medians of the pixel values of the respective sets of corresponding pixels.

The generation component may be configured to generate visual content of one or more output images based on the non-transient pixel values and/or other information. The output image(s) may be generated such that the visual content of the output image(s) do not include the depictions of the one or more transient objects within the scene. In some implementations, an output image may be a video frame of an output video.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
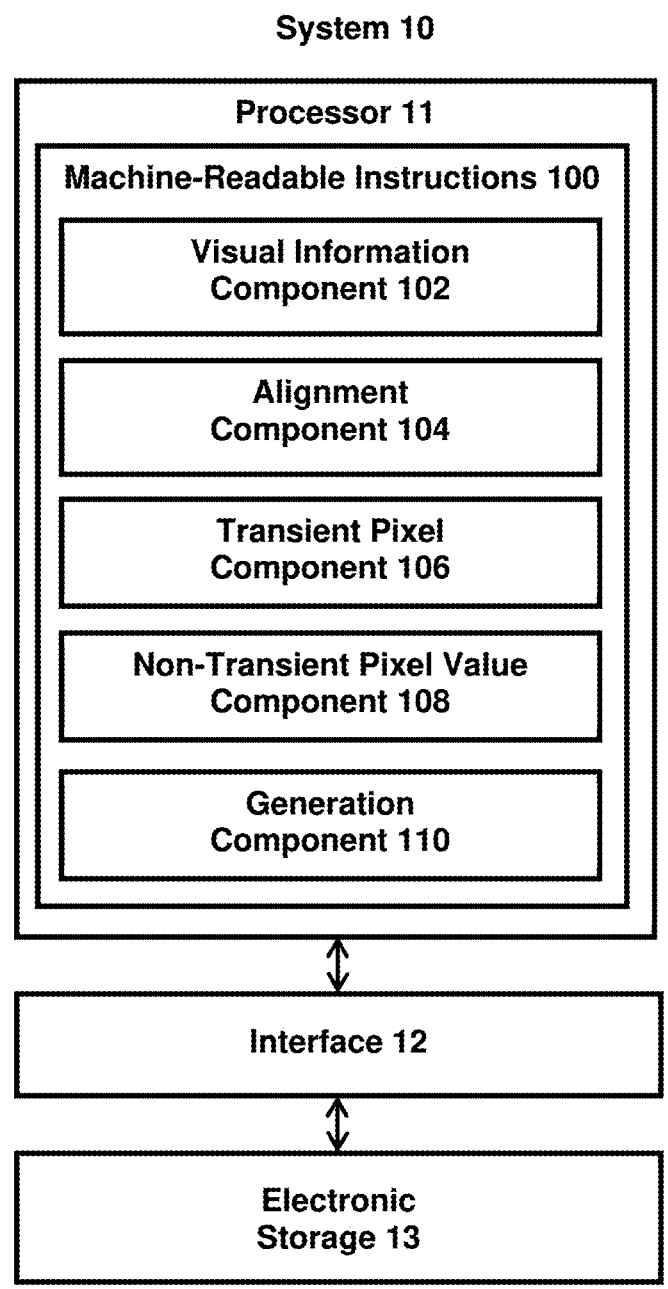
FIG. 1 illustrates an example system that removes transient elements in images.

FIG. 1 illustrates a system 10 for removing transient elements in images. The system 10 may include one or more of a processor 11, an interface 12 (e.g., bus, wireless interface), an electronic storage 13, and/or other components. Visual information and/or other information may be obtained by the processor 11. The visual information may define visual content of images captured by an image capture device at different moments. The visual content may include depictions of a scene captured at the different moments. The depictions of the scene may be defined by pixels of the images. The images may include a first image, a second image, a third image, and/or other images. The visual content of the first image may be captured at a first moment and may include a first depiction of the scene defined by pixels of the first image. The visual content of the second image may be captured at a second moment and may include a second depiction of the scene defined by pixels of the second image. The visual content of the third image may be captured at a third moment and may include a third depiction of the scene defined by pixels of the third image. The visual content of the images may be aligned by the processor 11 such that the pixels of the images defining the depictions of the scene captured at the different moments are aligned. The aligned pixels of the images may include sets of corresponding pixels across the images that define depictions of same parts of the scene. The sets of corresponding pixels may include a first set of corresponding pixels across the first image, the second image, and the third image that define depictions of a first part the scene. The first set of corresponding pixels may include a first pixel of the first image, a second pixel of the second image, and a third pixel of the third image.

For a given image of the images, transient pixels may be identified by the processor 11 based on changes between pixel values of individual sets of corresponding pixels and/or other information. The transient pixels may define depictions of one or more transient objects within the scene across the different moments. A first transient pixel may be identified based on changes between pixel values of the first pixel of the first image, the second pixel of the second image, and the third pixel of the third image, and/or other information. For the transient pixels, non-transient pixel values may be determined by the processor 11 based on the pixel values of respective sets of corresponding pixels and/or other information. Visual content of one or more output images may be generated by the processor 11 based on the non-transient pixel values such that the visual content of the output image(s) do not include the depictions of the one or more transient objects within the scene.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store visual information, information relating to images, information relating to visual content, information relating to alignment of visual content, information relating to aligned pixels, information relating to corresponding pixels across images, information relating to transient pixels, information relating to non-transient pixel values, information relating to output image, and/or other information.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate removing transient elements in images. The machine-readable instructions 100 may include one or more computer program components. The machine-readable instructions 100 may include one or more of a visual information component 102, an alignment component 104, a transient pixel component 106, a non-transient pixel value component 108, a generation component 110, and/or other computer program components.

The visual information component 102 may be configured to obtain visual information and/or other information. Obtaining visual information may include one or more of accessing, acquiring, analyzing, determining, examining, identifying, loading, locating, opening, receiving, retrieving, reviewing, storing, and/or otherwise obtaining the visual information. The visual information component 102 may obtain visual information from one or more locations. For example, the visual information component 102 may obtain visual information from a storage location, such as the electronic storage 13, electronic storage of information and/or signals generated by one or more sensors, electronic storage of a device accessible via a network, and/or other locations.

The visual information component 102 may obtain visual information from one or more hardware components (e.g., an image sensor) and/or one or more software components (e.g., software running on a computing device). Visual information may be obtained during acquisition of the visual content and/or after acquisition of the visual content by one or more image capture devices. For example, the visual information component 102 may obtain visual information defining visual content while the visual content is being captured by an image capture device. The visual information component 102 may obtain visual information defining visual content after the visual content has been captured and stored in memory (e.g., the electronic storage 13).

In some implementations, the visual information component 102 may obtain visual information based on user interaction with a user interface/application (e.g., image/video editing application, image/video player application), and/or other information. For example, a user interface/application may provide option(s) for a user to select visual content from which depictions of transient objects (transient elements) are to be removed. The visual information defining visual content of images may be obtained based on the user's selection of the visual content/images through the user interface/application. Other selections of visual content/images are contemplated.

The visual information may define visual content of images captured by an image capture device at different moments. The visual information may define visual content by including information that defines one or more content, qualities, attributes, features, and/or other aspects of the visual content. For example, the visual information may define visual content of an image by including information that makes up the content of the image, and/or information that is used to determine the content of the image. For instance, the visual information may include information that makes up and/or is used to determine the arrangement of pixels, characteristics of pixels, values of pixels, and/or other aspects of pixels that define visual content of the image. For example, the visual information may include information that makes up and/or is used to determine pixels of the image. Other types of visual information are contemplated.

An image capture device may refer to a device for recording visual information in the form of images, videos, and/or other media. An image capture device may be a standalone device (e.g., camera) or may be part of another device (e.g., part of a smartphone, tablet). The system 10 may be remote from the image capture device or local to the image capture device. One or more portions of the image capture device may be remote from or a part of the system 10. One or more portions of the system 10 may be remote from or a part of the image capture device. For example, one or more components of the system 10 may be carried by a housing, such as a housing of an image capture device. Removal of transient elements in images may be performed by one or more processors of the image capture device and/or one or more processors remote from the image capture device.

Images may be captured during a capture duration by the image capture device. A capture duration may be measured/defined in terms of time durations and/or frame numbers. For example, images may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may refer to content of one or more images that may be consumed visually. An image may include a standalone image or an image within a sequence of images (e.g., burst images, video frames). For example, an image may be one of multiple images taken of a scene and/or a video frame of a video taken of a scene. Video frames may define the visual content of the video content. That is, video content may include video frames that define the visual content of the video content. Video frames may define visual content viewable as a function of progress through the progress length of the video content. A video frame may include an image of the video content at a moment within the progress length of the video content. A video frame may include one or more of I-frame, P-frame, B-frame, frame of pixels, and/or other video frames.

Visual content may be generated based on light received within a field of view of a single image sensor or within fields of view of multiple image sensors during a capture duration. Visual content may include visual elements and/or other visually consumable content. Visual elements may refer to parts of the visual content. One or more visual elements may form depiction of things (e.g., persons, objects, scene, environment, space) included within the visual content. Visual elements may be defined by one or more pixels. Visual elements included within visual content of an image may be defined by one or more pixels of the image.

Visual content may have a field of view. A field of view of visual content may refer to an extent of a scene captured and/or viewable within the visual content. A field of view of visual content may refer to a part of a scene from which light is received for generation of the visual content.

In some implementations, an image may include a wide-angle image, and the visual information may define visual content of one or more wide-angle images. A wide-angle image may refer to an image captured through use of one or more wide-angle optical elements, such as one or more wide-angle lens. In some implementations, a wide-angle lens may include a viewing angle of more than about 60 degrees. Other wide-angle images are contemplated.

A wide-angle image may include a spherical image. A spherical image may include visual content viewable from one or more points of view (e.g., within a sphere, center of a sphere). Spherical visual content may be generated through capture of multiple views from a single location. Spherical visual content may be captured through the use of one or more image capture devices (e.g., image sensors, cameras) to capture images from a location. The captured images may be stitched together to form the spherical visual content of the spherical image. Spherical visual content may include full spherical visual content (360 degrees of capture, 360 degrees field of view) or partial spherical visual content (less than 360 degrees of capture, less than 360 degrees field of view). Partial spherical visual content may be referred to as panoramic visual content.

Visual content of images may include depictions of a scene captured at different moments within the capture duration. A scene may refer to a place in the real world that is captured in visual form by the image capture device. A scene may refer to a place and/or a location in which the image capture device is located while capturing visual content. A scene may include one or more portions of a place and/or a location at which the image capture device is directed during capture of the visual content. A scene may include one or more portions of a place and/or a location that are within the field of view of the image capture device during capture of the visual content. A scene may include static things (e.g., environment, non-moving objects) and/or dynamic things (e.g., moving objects).

A scene that is captured within the images may not be confined to a portion of a place depicted within the field of view of a single image. The scene that is captured within the images may include one or more portions of a place depicted within the fields of view of the multiple images. Visual content of images may include depictions of the same or different portions of the place. The portion(s) of the place observed through the image capture device during the capture duration may be used to generate the depictions of the scene within the images.

Visual content of the images may include depictions of the same field of view of the scene at different moments. The images may include the depictions of the same field of view of the scene based on the image capture device being directed towards the same point within the scene when capturing the images. The images may include the depictions of the same field of view of the scene based on the image capture device observing the same extent of the scene when capturing the images.

The images may include depictions of the same field of view of the scene based on the image capture device not experiencing any movement during the capture duration. Same parts of the scene may be depicted within same spatial portions of the images based on the image capture device not experiencing any movement during the capture duration (e.g., between different moments during which visual content of the images are captured).

The image capture device may not experience translational or rotational movement during the capture duration. For example, the image capture device may capture visual content of the images while the image capture device is in a static position. For instance, the image capture device may be fixed on a tripod and the translational and rotational position of the image capture device may not change during the capture duration (e.g., between different moments during which visual content of the images are captured).

Visual content of the images may include depictions of different fields of view of the scene at different moment. The images may include the depictions of different fields of view of the scene based on the image capture device being directed towards different points within the scene when capturing the images. The images may include the depictions of different fields of view of the scene based on the image capture device observing the different extents of the scene when capturing the images. The depictions of different fields of view of the scene within the images may include overlapping fields of view within two or more of the images. The overlapping fields of view within the images may define overlapping portions of the visual content.

The images may include the depictions of different fields of view of the scene based on the image capture device experiencing movement during the capture duration. Same parts of the scene may be depicted within different spatial portions of the images based on the movement of the image capture device during the capture duration (e.g., between different moments during which visual content of the images are captured).

The image capture device may experience rotational and/or translational movement during the capture duration. Rotational movement of the image capture device may include rotation of the image capture device about one or more axes. For example, rotational movement of the image capture device may include rotation of the image capture device about a yaw axis, a pitch axis, a roll axis, and/or other axis. Translational movement of the image capture device may include displacement of the image capture device along one or more translational directions. For example, translational movement of the image capture device may include displacement of the image capture device along a forward direction, a backward direction, a lateral direction, a vertical direction, and/or other directions.

For example, the image capture device may capture visual content of the images while the image capture device is being rotated (e.g., about yaw, pitch, and/or roll axis) and/or shifted (e.g., laterally and/or vertically displaced) due to jittering of the image capture device during the capture duration. Jittering of the image capture device may refer to slight irregular movement, variation in position, unsteadiness, and/or other jittering of the image capture device. Jittering of the image capture device may refer to unintentional and/or sporadic movement of the image capture device. Jittering of the image capture device may be caused by the way in which the image capture device is being held while capturing images. For instance, the image capture device may experience jittering based on shakiness of the hand(s), mount(s), and/or other thing(s) holding the image capture device.

The image capture device may capture visual content of the images while the image capture device is being rotated (e.g., about yaw, pitch, and/or roll axis) due to panning of the image capture device during the capture duration. Panning of the image capture device may refer to regular, gradual, and/or smooth rotation of the image capture device about one or more axes. Panning of the image capture device may refer to rotation of the image capture device about one or more axes to generate a panorama of the scene. Panning of the image capture device may refer to intentional and/or continuous movement of the image capture device. Panning of the image capture device may be caused by the way in which the image capture device is being held while capturing images. For instance, the image capture device may be panned based on angular movement/rotation of the hand(s), mount(s), and/or other thing(s) holding the image capture device to point the image capture device in different directions during the capture duration.

Image captured during panning of the image capture device may be stitched together to form a panoramic image. The images may be stitched by aligning overlapping/matching portions of the images. A larger panoramic image is generated by combining/aggregating the images/portions of the images. For example, the image capture device may be panned horizontally to generate a horizontal panoramic image. The image capture device may be panned vertically to generate a vertical panoramic image. Panning in other directions and generations of other types of panoramic images are contemplated.

The image capture device may capture visual content of the images while the image capture device is being translationally moved (e.g., along one or more directions). Translational movement of the image capture device may be caused by translational displacement of the image capture device during the capture duration. Translational movement of the image capture device may include constant, non-constant, regular, and/or irregular translational displacement of the image capture device. For instance, the image capture device may be translationally moved based on translational movement/displacement of the hand(s), mount(s), and/or other thing(s) holding the image capture device physically move the image capture device from one location to another location during the capture duration. For example, the image capture device may be held/mounted on a person, an animal, a vehicle, and/or other things that are moving forward and/or backwards.

The depictions of the scene may be defined by pixels of the images. For example, the images may include a first image, a second image, a third image, and/or other images. The visual content of the first image may be captured at a first moment (e.g., point in time, duration of time) within the capture duration and may include a first depiction of the scene defined by pixels of the first image. The visual content of the second image may be captured at a second moment within the capture duration and may include a second depiction of the scene defined by pixels of the second image. The second moment may be subsequent to the first moment within the capture duration. The visual content of the third image may be captured at a third moment within the capture duration and may include a third depiction of the scene defined by pixels of the third image. The third moment may be subsequent to the second moment within the capture duration.

Figure 4A:
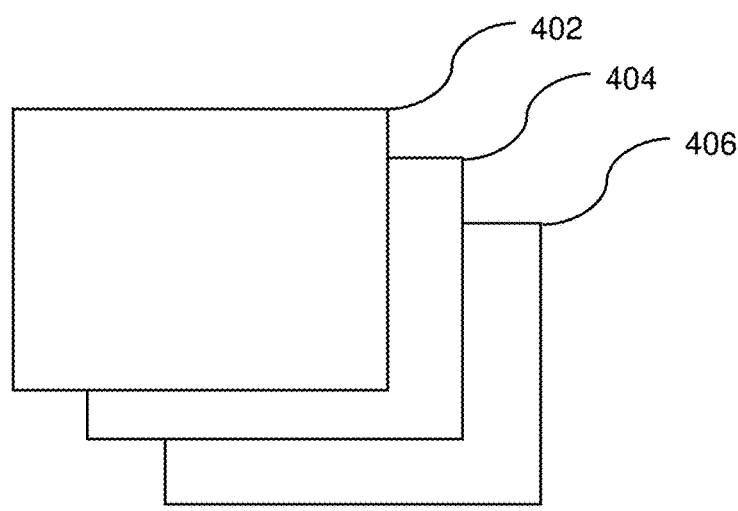
FIG. 4A illustrates example images captured by an image capture device at different moments.

FIG. 4A illustrates example images 402, 404, 406 captured by an image capture device. The image 402, 404, 406 may be captured by an image capture device at different moments within a capture duration. The image 402 may be captured at a moment before moments during which the images 404, 406 are captured. The image 404 may be captured at a moment before moment at which the image 406 is captured. The images 402, 404, 406 may be captured in a sequence, such that the image 402 is the first image that is captured, the image 404 is the second image that is captured, and the image 406 is the third image that is captured in the sequence. For example, the images 402, 404, 406 may be adjacent video frames within a progress length of a video.

Visual content of images may include depictions of one or more transient objects, one or more non-transient objects, and/or other objects. A transient object may refer to an object that moves within the scene during the capture duration. A transient object may refer to an object that moves between different locations within the scene between two or more moments during which images are captured. A transient object may refer to an object that is depicted at particular spatial location(s) within the images based on changes in the object's locations within the scene during the capture duration. For example, a transient object may include a moving person, a moving body part (e.g., hand, feet), a moving animal, a moving vehicle, a moving thing, and/or other moving objects. Other transient objects are contemplated.

A non-transient may refer to an object that does not move within the scene during the capture duration. A non-transient object may refer to an object that remains stationary at a location within the scene between two or more moments during which images are captured. A non-transient object may refer to an object that is depicted at particular spatial location(s) within the images based on the object locations within the scene remaining fixed during the capture duration. For example, a non-transient object may include a stationary person, a stationary animal, a stationary vehicle, a stationary thing, a building, a road, a landscape, the ground, the sky, and/or other stationary objects. Other non-transient objects are contemplated.

Figure 4B:
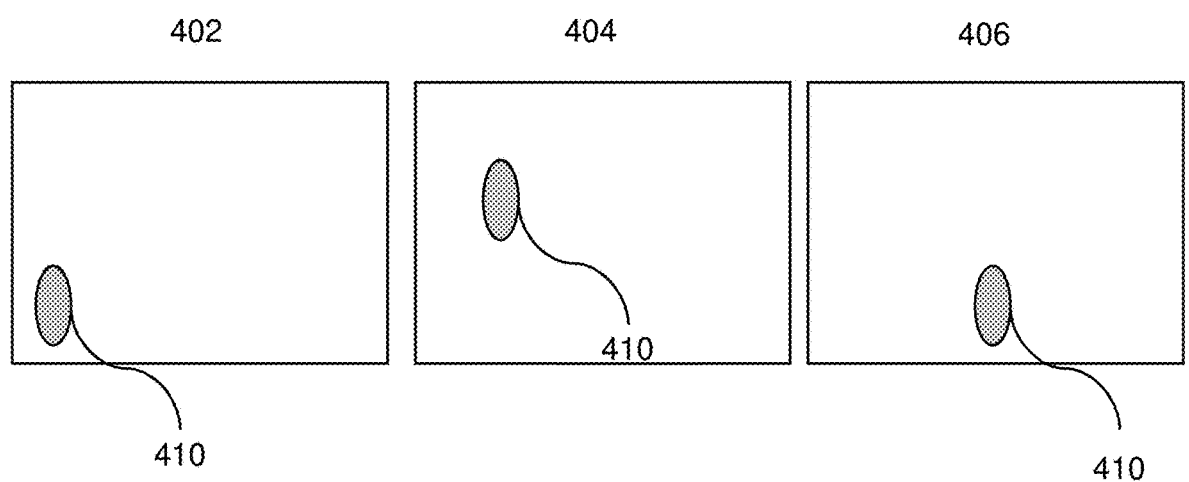
FIG. 4B illustrate example depictions of transient objects within images.

FIG. 4B illustrate example depictions of a transient object 410 within the images 402, 404, 406. The transient object 410 may move between different locations within the scene between different moments during which images 402, 404, 406 are captured. The transient object 410 may be depicted at particular spatial locations within the images 402, 404, 406 based on changes in the object's locations within the scene during the capture duration. For example, based on the images 402, 404, 406 including depictions of the same field of view of the scene at different moments (e.g., the image capture device did not move during the capture duration), the transient object 410 may be depicted at different spatial locations within the images 402, 404, 406 based the transient object 510 moving within the scene. Based on the images 402, 404, 406 including depictions of the different fields of view of the scene at different moments (e.g., the image capture device moved during the capture duration), the spatial locations of the depictions of the transient object 510 within the images 402, 404, 406 may be determined based on both the movement of transient object 510 within the scene and the movement of the image capture device during the capture duration.

While FIG. 4B shows the depictions of the transient object within all three images 402, 404, 406, this is merely as an example and not meant to be limiting. In some implementations, the depiction of the transient object may not be included within one or more of the images.

A depiction of a transient object may be defined by one or more pixels of an image. A pixel of the image that defines a depiction of a transient object may be referred to as a transient pixel. A depiction of a non-transient object may be defined by one or more pixels of an image. A pixel of the image that defines a depiction of a non-transient object may be referred to as a non-transient pixel. For example, in FIG. 4B, the pixels of the images 402, 404, 406 that define the depictions of the transient object 410 may be referred to as transient pixels. Other pixels of the images 402, 404, 406 may define depictions of non-transient objects may be referred to as non-transient pixels.

A user may not wish to include depictions of transient objects within images. For example, a user may wish to capture/generate one or more images (e.g., standalone images, sequence of images, video frames of a video) that provides a landscape shot of a scene. During the capture duration, one or more transient objects may move within the scene and contaminate the landscape shot. For instance, during capture of images using an image capture device fixed in place or being panned, a person may be walking within the field of view of the image capture device. During capture of images using an image capture device mounted on a person, one or more body parts of the person may move within the field of view of the image capture device. The depictions of transient objects in an image may be reduced/removed by replacing the values of the transient pixels in the image with the values of non-transient pixels in other image(s). For example, referring to FIG. 4B, the depiction of the transient object 410 in the image 402 may be removed from the image 402 by replacing the values of the transient pixels defining the depiction of the transient object 410 with values of the non-transient pixels within the image 404 and/or the image 406 that defines the depiction of same location within the scene without the transient object 410 (e.g., background).

Figure 3A:
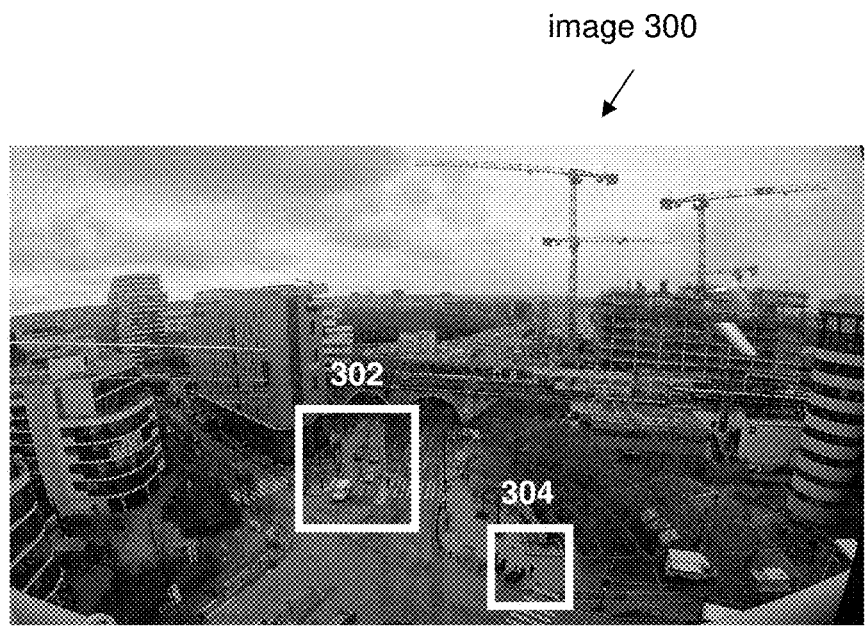
FIG. 3A illustrates an example image.
Figure 3B:
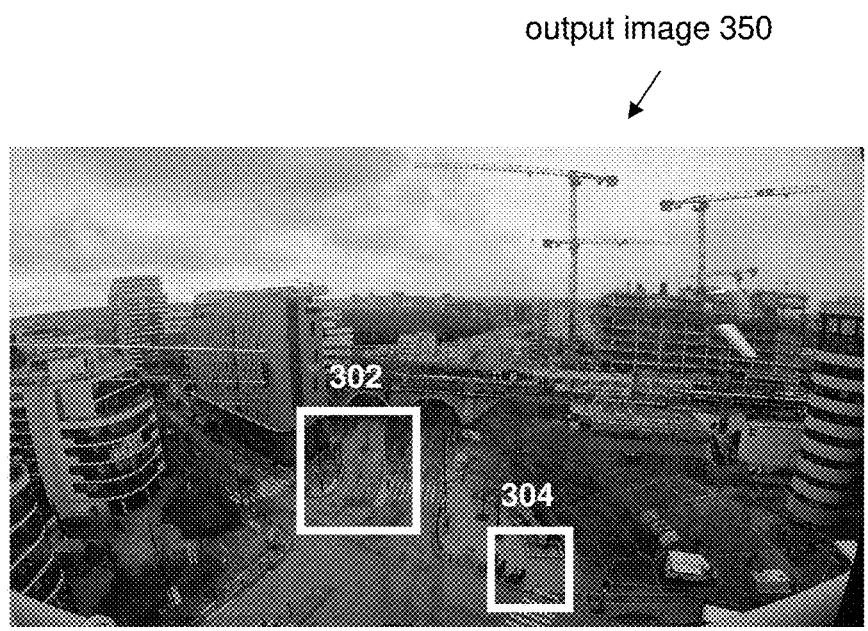
FIG. 3B illustrates an example output image.

FIG. 3A illustrates an example image 300. The visual content of the image 300 may include depictions of transient objects. For example, a portion 302 of the image 300 may include depictions of moving vehicles and a portion 304 of the image 300 may include a depiction of a moving person. FIG. 3B illustrates an example output image 350. The visual content of the output image 350 may be generated to reduce/remove depictions of transient objects. For example, the portion 302 may the output image 350 may not include the depictions of moving vehicles and the portion 304 of the output image 350 may not include the depiction of the moving person. Other removals of transient objects are contemplated.

The alignment component 104 may be configured to align the visual content of the images. Aligning visual content of different images may include arranging the visual content of the images relative to one another so that depictions of the same parts of the scene are spatially co-located within the aligned visual content. Aligning visual content of different images may include arranging the visual content of the images relative to one another so that aligned portions of the visual content depict same parts (e.g., observable points, areas, locations, spaces, angles of view) of the scene. Aligning visual content of different images may include aligning overlapping portions of the visual content of the images so that the pixels that defined the overlapping portions are spatially co-located within the aligned visual content. An overlapping portions of the visual content may refer to portions of the visual content that depicts the same parts of the scene. A part of a scene may refer to an observable point, area, location, space, and/or angle of view of the scene seen through an optical element (e.g., lens) of an image capture device. The visual content may be aligned so that the aligned visual content appears to have been captured by a fixed image capture device. The visual content may be aligned so that the aligned visual content include depictions of the same field of view of the scene.

Alignment of the visual content may be performed based on visual analysis of the images, movement of the image capture device, and/or other information. Visual analysis may refer to examination of the visual characteristics of the visual content. Visual analysis may be used to identify overlapping portions of different images, features that are common within different images, and/or other information that may be used to align the visual content. For example, visual analysis may include one or more of feature detection (e.g., SIFT, SURF), object detection, landscape detection, composition analysis, visual similarity analysis, visual matching analysis, and/or other visual analysis. Visual analysis may be used to determine how the visual content should be arranged relative to another so that the visual content of different images are aligned.

Movement of the image capture device (e.g., rotational movement, translational movement) during capture duration may be used to determine relative change in rotational and/or translational positions of the image capture device during capture of the different images. Movement of the image capture device may be determined based on position sensor (e.g., accelerometer, gyroscope, inertial measurement unit, GPS) outputs of the image capture device. The difference in the rotational and/or translational positions of the image capture device during capture of the different images may be used to determine how the visual content should be arranged relative to another so that the visual content of different images are aligned.

In some implementations, the movement of the image capture device during capture duration may be used to perform initial alignment of the visual content, and the visual analysis may be used to improve the alignment of the visual content. The initial alignment of the visual content via the image capture device movement may facilitate use of visual analysis to perform visual content alignment. The movement of the image capture device may be used to estimate the alignment of the visual content of different images, and visual analysis may be performed based on the initial alignment to focus the visual analysis on portions of the visual content that are likely to include overlapping portions and/or common features. Such initial estimate of visual content alignment may make it easier (e.g., faster, consume less computational resources) to align the visual content using visual analysis.

Aligned visual content of images may include aligned pixels. Aligned pixels may refer to pixels of images that are aligned to pixels of other images. The aligned pixels of the images may include sets of corresponding pixels across different images that define depictions of same parts of the scene. For example, the sets of corresponding pixels may include a set of corresponding pixels across multiple images that define depictions of one particular part (observable point, area, location, space, and/or angle of view) of the scene. The set of corresponding pixels across multiple images may define same point/extent within the overlapping portions of the visual content.

For instance, for three images, a set of corresponding pixels may include one pixel of the first image, one pixel of the second image, and one pixel of the third image that are aligned to one another and that depict the same part of the scene. The individual pixels within the set of corresponding pixels may depict the same portion of the scene observed by the image capture device at different moments within the capture duration.

Figure 5A:
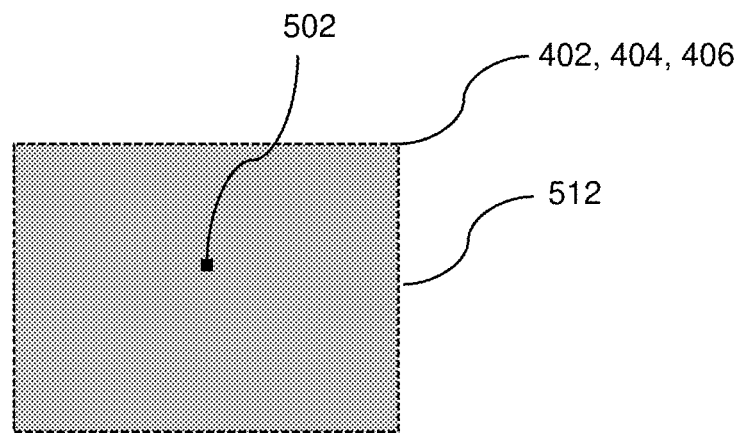
FIGS. 5A, 5B, 5C, and 5D illustrate example alignments of the images shown in FIG. 4.

FIG. 5A illustrates an example alignment of the images 402, 404, 406 based on the images 402, 404, 406 having been captured by an image capture device that did not experience any movement during the capture duration. The images 402, 404, 406 may include depictions of the same field of view of the scene based on the image capture device not moving during the capture duration. Because the same parts of the scene are depicted within the same spatial portions of the images 402, 404, 406, the alignment of the images 402, 404, 406 may not include any adjustment in position of the images 402, 404, 406 relative to one another.

The aligned visual content of the images 402, 404, 406 may include visual content within an extent 512. A set of corresponding pixels 502 that define depictions of one particular part of the scene may be located within the extent 512. The extent 512 may include overlapping portions of the visual content of the image 402, 404, 406. The set of corresponding pixels 502 that define depictions of one particular part of the scene may be located at the same spatial portion (e.g., x-y location) within the aligned images 402, 404, 406.

Figure 5B:
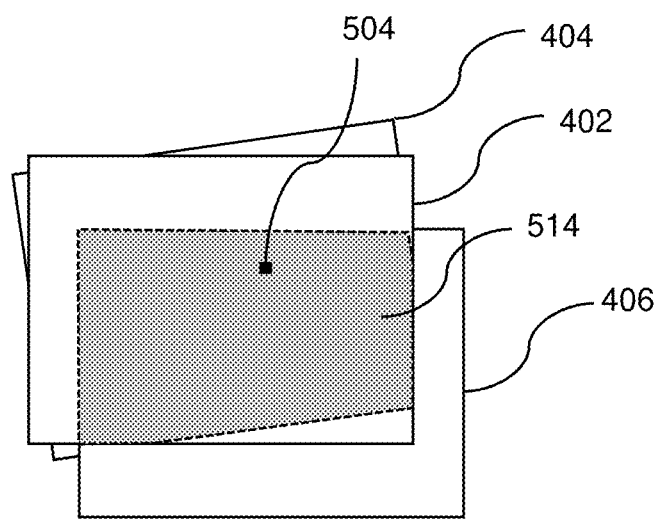

In images captured by an image capture device that experienced movement during the capture duration, different spatial portions of the visual content of the images may overlap and the images may need to be adjusted in position relative to one another to align the visual content. For example, FIG. 5B illustrates an example alignment of the images 402, 404, 406 based on the images 402, 404, 406 having been captured by an image capture device that experienced movement during the capture duration due to jittering of the image capture device during the capture duration. The images 402, 404, 406 may include depictions of different fields of view of the scene based on the image capture device moving during the capture duration. Because different parts of the scene are depicted within the same spatial portions of the images 402, 404, 406, the alignment of the images 402, 404, 406 may include adjustment in position of the images 402, 404, 406 relative to one another. For example, the images 402, 404, 406 may be arranged relative to one another as shown in FIG. 5B so that the aligned portions of the visual content of the images 402, 404, 406 depict same parts of the scene. The adjustment of the visual content of the images 402, 404, 406 may include changes in rotational and/or translational positions of the visual content with respect to one another. The adjustment of the visual content of the images 402, 404, 406 may include one or more of the visual content being rotated to the left and/or right. Other rotations of visual content are contemplated.

The adjustment of the visual content of the images 402, 404, 406 may include one or more of the visual content being shifted laterally and/or vertically. In some implementations, the adjustment of the visual content of the images 402, 404, 406 may include warping of the visual content to account for different rotational and/or translational positions from which the visual content was captured by the image capture device. Other shifting of visual content are contemplated.

The aligned visual content of the images 402, 404, 406 may include visual content within an extent 514. The extent 514 may include overlapping portions of the visual content of the image 402, 404, 406. A set of corresponding pixels 504 that define depictions of one particular part of the scene may be located within the extent 514. The set of corresponding pixels 504 that define depictions of one particular part of the scene may be located at the same spatial portion (e.g., x-y location) within the aligned images 402, 404, 406.

Figure 5C:
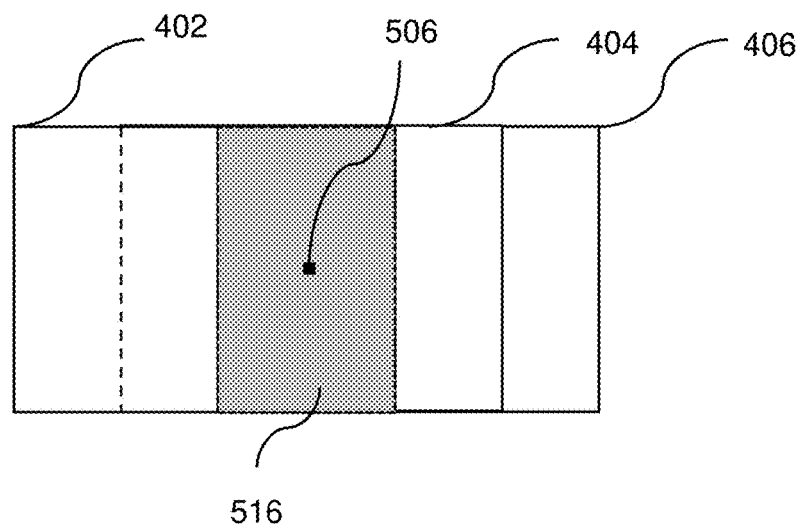

FIG. 5C illustrates an example alignment of the images 402, 404, 406 based on the images 402, 404, 406 having been captured by an image capture device that experienced movement during the capture duration due to panning (e.g., from left to right) of the image capture device during the capture duration. The images 402, 404, 406 may include depictions of different fields of view of the scene based on the image capture device moving during the capture duration. Because different parts of the scene are depicted within the same spatial portions of the images 402, 404, 406, the alignment of the images 402, 404, 406 may include adjustment in position of the images 402, 404, 406 relative to one another. For example, the images 402, 404, 406 may be arranged relative to one another as shown in FIG. 5C so that the aligned portions of the visual content of the images 402, 404, 406 depict same parts of the scene.

The adjustment of the visual content of the images 402, 404, 406 may include changes in rotational and/or translational positions of the visual content with respect to one another. The panning of the image capture device during the capture duration may result in a lateral portion of the visual content of one image to overlap with an opposing lateral portion of the visual content of the next image (captured at the subsequent/adjacent moment during the capture duration). For example, in FIG. 5C, a right portion of the visual content of the image 402 may overlap with a left portion of the visual content of the image 404. A right portion of the visual content of the image 404 may overlap with a left portion of the visual content of the image 406.

The adjustment of the visual content of the images 402, 404, 406 may include one or more of the visual content being shifted laterally based on lateral panning of the image capture device during the capture duration. The adjustment of the visual content may include one or more of the visual content being shifted vertically based on vertical panning of the image capture device during the capture duration. In some implementations, the adjustment of the visual content of the images 402, 404, 406 may include warping of the visual content to account for different rotational positions from which the visual content was captured by the image capture device. Other shifting of visual content are contemplated.

The aligned visual content of the images 402, 404, 406 may include visual content within an extent 516. The extent 516 may include overlapping portions of the visual content of the image 402, 404, 406. A set of corresponding pixels 506 that define depictions of one particular part of the scene may be located within the extent 516. The set of corresponding pixels 506 that define depictions of one particular part of the scene may be located at the same spatial portion (e.g., x-y location) within the aligned images 402, 404, 406.

Figure 5D:
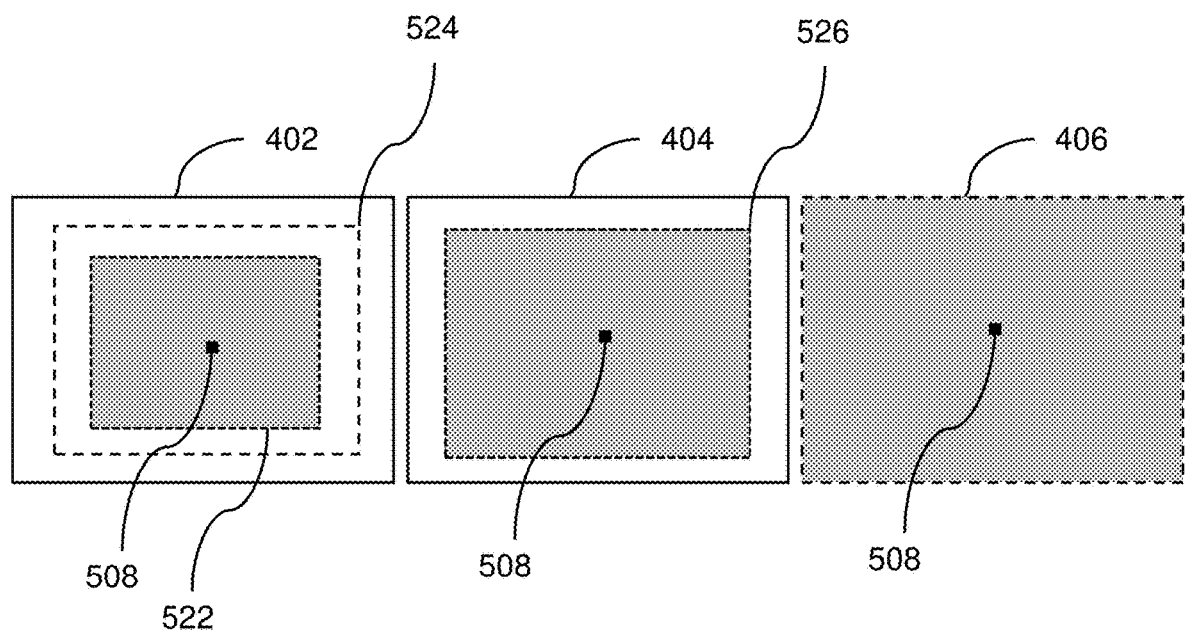

FIG. 5D illustrates an example alignment of the images 402, 404, 406 based on the images 402, 404, 406 having been captured by an image capture device that experienced movement during the capture duration due to translational movement (e.g., forward movement) of the image capture device during the capture duration. The images 402, 404, 406 may include depictions of different fields of view of the scene based on the image capture device moving during the capture duration. Because different parts of the scene are depicted within the same spatial portions of the images 402, 404, 406, the alignment of the images 402, 404, 406 may include adjustment in position of the images 402, 404, 406 relative to one another. For example, the images 402, 404, 406 may be arranged relative to one another so that the aligned portions of the visual content of the images 402, 404, 406 depict same parts of the scene.

The adjustment of the visual content of the images 402, 404, 406 may include changes in sizes of the visual content with respect to one another. The translational movement of the image capture device during the capture duration may result in a center portion of the visual content of one image to overlap with a center portion of the visual content of the next image (captured at the subsequent/adjacent moment during the capture duration). The center portion of the visual content of the image may be smaller than the center portion of the visual content of the next image based on forward movement between the moments during which the images are captured. For example, in FIG. 5D, a center portion 524 of the visual content of the image 402 may overlap with the visual content of the image 404. A center portion 522 of the visual content of the image 402 may overlap with a center portion 526 of the visual content of the image 404. The center portion 526 of the visual content of the image 404 may overlap with the visual content of the image 406. The center portion 522 of the visual content of the image 402 may be smaller than the center portion 526 of the visual content of the image 404 based on forward movement between the moments during which the images 402, 404 are captured.

The adjustment of the visual content of the images 402, 404, 406 may include one or more of the visual content being warped to compensate for different sizes of the overlapping portions of the visual content. For example, the center portion 522 of the visual content of the image 402 may be warped to increase the size of the center portion 522 to compensate for the center portion 522 being smaller than the center portion 526 of the visual content of the image 404. The size of the center portion 522 of the visual content of the image 402 may be increased to be same size as the size of the center portion 526 of the visual content of the image 404. The visual content of the image 406 may be warped to decrease the size of the visual content to compensate for the visual content of the image 406 being larger than the center portion 526 of the visual content 404. The size of the visual content of the image 406 may be decreased to be same size as the size of the center portion 526 of the visual content 404. The warping of the visual content may account for different translational positions from which the visual content was captured by the image capture device. The warping of the visual content may compensate for parallax effects in the images due to different translational positions from which the visual content was captured by the image capture device. Other warping of visual content are contemplated.

The aligned visual content of the images 402, 404, 406 may include visual content within an extent that include overlapping portions of the visual content of the image 402, 404, 406. A set of corresponding pixels 508 that define depictions of one particular part of the scene may be located within the extent that include overlapping portions. The set of corresponding pixels 508 that define depictions of one particular part of the scene may be located at the same spatial portion (e.g., x-y location) within the aligned images 402, 404, 406.

The transient pixel component 106 may be configured to identify, for a given image of the images, transient pixels based on changes between pixel values of individual sets of corresponding pixels and/or other information. A transient pixel may refer to a pixel of an image that defines a depiction of a transient object. Transient pixels within images may define depictions of one or more transient objects within the scene across the different moments at which the images are captured. A pixel value of a pixel may refer to a value that defines one or more visual characteristics of the pixel. A pixel value of a pixel may define one or more intensities of the visual characteristic(s) of the pixel. For example, a pixel value of a pixel may define one or more of brightness of the pixel and/or the color of the pixel.

A pixel within a set of corresponding pixels may be identified to be a transient pixel based on the changes between the pixel values of the pixels within the set of corresponding pixels and/or other information. For example, for three images, a set of corresponding pixels may include one pixel of the first image, one pixel of the second image, and one pixel of the third image that are aligned to one another and that depict the same part of the scene. One of the three pixels may be identified to be a transient pixel based on the changes between the pixel values of the three pixels.

For example, referring to FIG. 5A, the set of corresponding pixels 502 may define depictions of one particular part of a scene. The pixels within the set of corresponding pixels 502 may include one pixel of the image 402, one pixel of the image 404, and one pixel of the image 406. The pixels of the images 402, 404, 406 may have been captured at different moments within the capture duration. An object, such as a person, may be moving within the scene during the capture duration. Based on different moments at which the images 402, 404, 406 are captured, only one of the pixels within the set of corresponding pixels 502 may define a depiction of the person (transient object). For example, the pixel of the image 402 and the pixel of the image 406 may define a depiction of a non-transient object (e.g., background) while the pixel of the image 404 may define a depiction of the transient object (e.g., a part of a person) based on the person moving from left to right within the scene depicted within the images 402, 404, 406. For instance, the moving person may be depicted within a left portion of the image 402, a center of the image 404, and a right portion of the image 406. The center portion of the image 402 and the center portion of the image 406 may depict the background while the center portion of the image 404 may depict the moving person.

The change between depictions of the moving person and the background within the set of corresponding pixels 502 may result in large changes in the pixel values of the set of corresponding pixels. Even without changes between depictions of transient objects and non-transient objects, the pixel values of pixels within a set of corresponding pixels may change between adjacent images. For instance, the color and/or intensity of the pixels may change slightly between adjacent images due to noise (e.g., photographic noise). However, the pixels changing from depicting a non-transient object to a transient object may cause greater than in the color and/or intensity of the pixels (assuming that the transient object is of different color with respect to the background). A spike in the changes in the pixel values of the pixels within the set of corresponding pixels may be used to identify pixels that depict a transient object. A spike in the changes in the pixel values of the pixels may refer to a rapid change in the pixel values of the pixels over time/a number of images. For instance, a sudden increase or decrease in the pixel values may indicate that the pixel has changed from depicting a non-transient object to a transient object, or vice versa.

In some implementations, identification of the transient pixels based on the changes between the pixel values of the individual sets of corresponding pixels may include identification of the transient pixels based on the changes between pixel values of individual sets of corresponding pixels exceeding a threshold value, and/or other information. For example, identification of the transient pixels based on the changes between the pixel values of the individual sets of corresponding pixels may include, for the example including three images, identification of one of the three pixels as a transient pixel based on the changes between the pixel values of the three pixels exceeding a threshold value. A threshold value may refer to a value of pixel value change that is used to detect a transient pixel. A threshold value may refer to the pixel value change that must be exceeded or met to identify a pixel as a transient pixel. For example, the threshold value may refer to the pixel value by which the values of the pixel must change for a pixel to be identified as a transient pixel. The threshold value may be associated with a duration of time and/or a number of images. For example, the threshold value may define the pixel value by which the values of the pixel must change within a duration of time and/or within a certain number of images in a sequence for a pixel to be identified as a transient pixel. Thus, the pixels may be labeled as transient pixels and/or non-transient pixels by applying thresholding over the values of the pixels over time.

In some implementations, identification of the transient pixels based on the changes between the pixel values of the individual sets of corresponding pixels may include identification of the transient pixels based on difference of a pixel value of a pixel from a majority pixel value of the set of corresponding pixels. A transient object may be depicted by a pixel within the set of corresponding pixel less than half of the time. For example, for the example including three images, only one of the three pixels may define a depiction of the transient object. Other two pixels may define a depiction of a non-transient object (e.g., background). A majority pixel value of correspond to values of the corresponding pixels that are within a majority threshold value of each other. The majority threshold value by which the majority pixel value is determined may be the same as or less than the threshold value used to identify transient pixels. The pixel values that are within the majority threshold value of each other may be identified as pixel values that are changing slightly due to noise, rather than due to change in depiction between a transient object and a non-transient object. The majority pixel value may be determined as mean, mode, and/or median of pixel values of the set of corresponding pixels that are within the majority threshold value of each other. Pixels with pixel values that deviates (greater than, less than) from the majority pixel value by or more than the threshold value may be identified as transient pixels.

Figure 6:
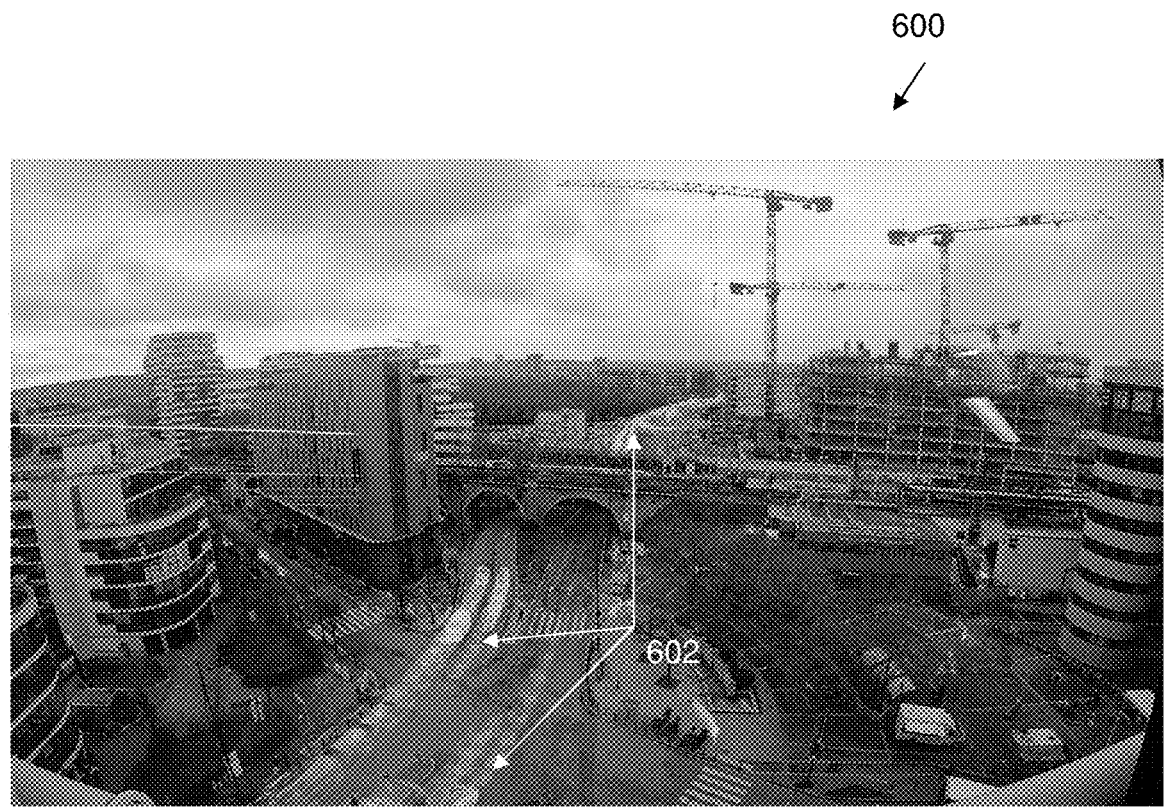
FIG. 6 illustrates example transient pixels identified within an image.

FIG. 6 illustrates example transient pixels 602 identified within an image 600. The image 600 may be one of many images captured by an image capture device over a capture duration. The pixel values of the images may be analyzed to identify the transient pixels 602. The transient pixels 602 may include those pixels in the images that depict transient objects. The transient pixels 602 may form trails of paths taken by the transient objects across the images. For example, the transient pixels 602 may depict the transient objects (e.g., moving vehicles) located at different positions within the scene as captured within the images. The values of the transient pixels 602 within an image may be replaced with values of corresponding non-transient pixels to remove depictions of transient objects within the image.

In some implementations, one or more views of the transient pixels within images may be presented. For example, a view of transient pixels as shown in FIG. 6 may be presented on one or more display. The transient pixel component 106 may be configured to receive user selection of one or more of the transient pixels to be excluded from removal. That is, a user may wish to keep depiction of one or more transient objects within one or more images, and the transient pixel component 106 may receive through the view of the transient pixels a user selection to keep the depiction of the transient object(s). For example, the transient pixels 602 may be displayed in color while the background of the image 600 is displayed in greyscale. A user may be able to exclude one or more of the transient pixels from removal by changing the color of the transient pixels from color to greyscale. Alternatively, a user's selection to remove a transient pixel from removal may result in the color of the of the transient pixel changing from color to greyscale. Such presentation of transient pixels may enable a user to easily see and select which of the transient object depictions will be removed from the images. Other combinations of color/greyscale are contemplated.

The non-transient pixel value component 108 may be configured to determine, for the transient pixels, non-transient pixel values based on the pixel values of respective sets of corresponding pixels and/or other information. For a set of corresponding pixels including a transient pixel, the non-transient pixel value may be determined based on the pixel values of the set of corresponding pixels. The non-transient pixel value for the transient pixel may be determined based on some or all of the non-transient pixel values of the set of corresponding pixels in images captured before the image including the transient pixel (preceding non-transient pixel values). The non-transient pixel value for the transient pixel may be determined based on some or all of the non-transient pixel values of the set of corresponding pixels in images captured after the image including the transient pixel (subsequent non-transient pixel values). The non-transient pixel value for the transient pixel may be determined based on some or all of the preceding and subsequent non-transient pixel values of the set of corresponding pixels. The non-transient pixel value determination may include or include the pixel value of the transient pixel.

For example, a non-transient pixel value for a transient pixel may be determined as one or more of a mean, mode, and/or median of some or all of the pixels within the respective set of corresponding pixels. Use of all of the pixels within the respective set of corresponding pixels may result in the pixel value of the transient pixel being replaced with a value that takes into account all of the pixel values at the corresponding location (e.g., x-y location) within the capture duration. Use of some of the pixels within the respective set of corresponding pixels may result in the pixel value of the transient pixel being replaced with a value that takes into account the pixel values at the corresponding location (e.g., x-y location) within a portion of the capture duration.

For instance, a sliding time window may be used for individual transient pixels to sample the pixel values at the same corresponding location in other images to determine the non-transient pixel value. Such determination of the non-transient pixel value may result in removal of transient pixel values (outliers) by replacing the transient pixel values with mean, mode, and/or median value computed over the neighborhood of the transient pixel. That is, the transient pixel values may be replaced by an approximation of the non-transient pixel values derived from neighboring pixel samples.

In some implementations, the non-transient pixel value may be determined for all pixels within an image, and the pixel values of all pixels may be replaced with the non-transient pixel values. That is, for individual pixels of the image, the pixels values may be replaced with the mean, mode, and/or median value (computed over the neighboring images or across all images), resulting in pixel-wise filtering of motion from the images. Such determination and replacement of pixel values may enable removal of transient object depictions from images with initial identification of the transient pixels. Such determination and replacement of pixel values may result in the pixel values of the transient pixels being changed to approximate the non-transient pixel values derived from neighboring pixels with small changes in the pixel values of the non-transient pixels.

In some implementations, the non-transient pixel values may be determined further based on one or more of temporal histogram, patch-based distance searching, oversampling on the input, modelling spatial correlations between pixels, and/or other information. Such determination of the non-transient pixel values may improve the quality of the output image(s). For example, such determination of the non-transient pixel values may reduce blurring/loss of resolution within the output image(s).

The generation component 110 may be configured to generate visual content of one or more output images based on the non-transient pixel values and/or other information. The visual content of the output image(s) may be generated with the pixel values of transient pixels set to the non-transient pixel values determined by the non-transient pixel value component 108. Generating the visual content of the output image(s) may include the values of the transient pixels being replaced with the corresponding non-transient pixel values. That is, the pixel values of the transient pixels may be set to a value that approximates the value that would have been captured if the transient object were not within the scene captured by the images. Such generation of the visual content of the output images may result in the visual content of the output image(s) not including the depictions of the transient object(s) within the scene.

The generation component 110 may generate visual content of a single output images or visual content of multiple output images. For example, visual content within multiple images of the scene may be used to generate a single image of the scene with the depictions of the transient object(s) removed. As another example, visual content within multiple images of the scene may be used to generate multiple images in a sequence with the depictions of the transient object(s) removed. For instance, the multiple image may be video frames of an input video, and the output image(s) generated by the generation component 110 may be video frame(s) of an output video.

Figure 7:
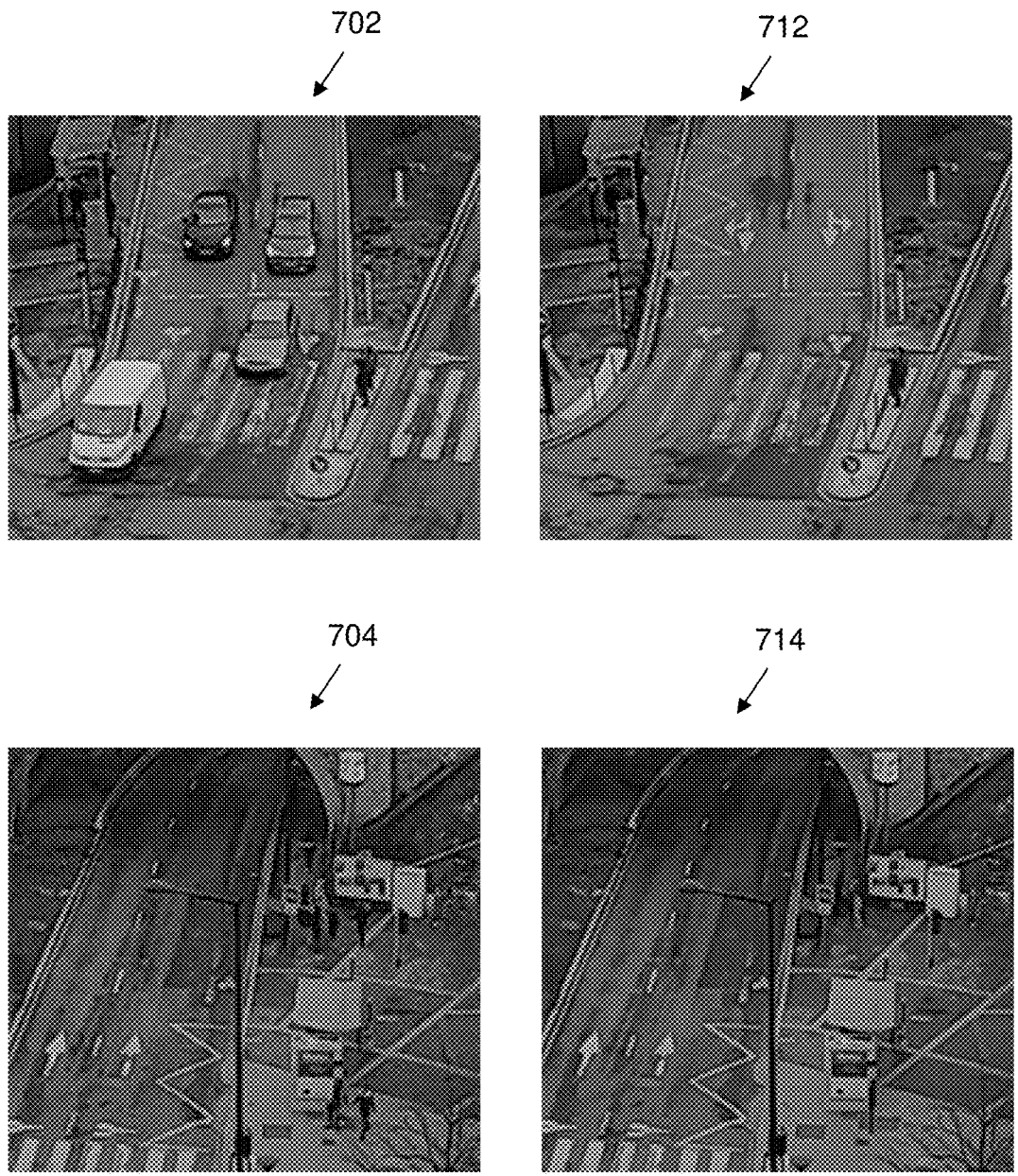
FIG. 7 illustrates example generation of output images based on non-transient pixel values.

FIG. 7 illustrates example generation of output images based on non-transient pixel values. Visual content of an image 702 may depict four vehicles on the road. The four vehicle move during capture of the image 702 and other images. The pixels defining the four vehicles may be identified as transient pixels and pixel values of other images of the road may be used to determine non-transient pixel values for the transient pixels. An image 712 may be generated by replacing the pixel values of the transient pixels depicting the vehicles with the non-transient pixel values. The image 712 may not include the depictions of the moving vehicles on the road. Visual content of an image 704 may depict persons in an area. The persons may move during capture of the image 704 and other images. The pixels defining the persons may be identified as transient pixels and pixel values of other images of the area may be used to determine non-transient pixel values for the transient pixels. An image 714 may be generated by replacing the pixel values of the transient pixels depicting the persons with the non-transient pixel values. The image 712 may not include the depictions of the moving persons in the area.

In some implementation, some or all of the techniques disclosed herein may be applied to remove depictions of transient objects in spherical visual content. Spherical visual content may include full spherical visual content (360 degrees of capture, 360 degrees field of view) or partial spherical visual content (less than 360 degrees of capture, less than 360 degrees field of view). Spherical visual content may be generated based on light received within a field of view of a single image sensor or within fields of view of multiple image sensors during a capture duration. For example, multiple images/videos captured by multiple cameras/image sensors may be combined/stitched together to form the spherical visual content. The field of view of camera(s)/image sensor(s) may be moved/rotated (e.g., via movement/rotation of optical element(s), such as lens, of the image sensor(s)) to capture multiple images/videos from a location, which may be combined/stitched together to form the spherical visual content.

One or more stabilization techniques may be applied to the spherical visual content. Application of the stabilization technique(s) may result in the spherical visual content being direction locked. For example, application of the stabilization technique(s) to spherical visual content of multiple spherical images (e.g., video frames) may result in the spherical visual content of the multiple spherical images being rotated to compensate for rotation of the image capture device(s) during the capture duration. Application of the stabilization technique(s) to spherical visual content of multiple spherical images may result in the spherical visual content of the multiple spherical images being rotated so that the spherical visual content includes depiction of objects that would have been captured if the spherical visual content were captured by image capture device(s) fixed to point in one direction. That is, the spherical visual content of multiple spherical images may be oriented in the same direction so that the spherical visual content appears to have been captured by image capture device(s) that did not move (e.g., rotate) during capture duration. Thus, application of the stabilization technique(s) to spherical visual content of multiple spherical images may result in the spherical visual content being aligned such that pixels of the spherical images defining the depictions of a scene captured at a different moments within the capture duration are aligned. The aligned pixels of the spherical images may include sets of corresponding pixels across the images that define depictions of same parts of the scene.

Transient pixels of the spherical images may be identified based on changes in pixel values of the sets of corresponding pixels, and non-transient pixel values may be determined for individual transient pixels. Spherical visual content of one or more output spherical images may be generated based on the non-transient pixel values such that the spherical visual content of the output spherical image(s) do not include the depictions of the transient object(s) within the scene. Other transient-object removal techniques (e.g., including CNN-based techniques) may be used to remove depiction of transient object(s) from the output spherical image(s). Transient-object depiction removal may be performed in the sensor space/3D space and the spherical visual content of the output spherical image(s) may be projected into image space/2D space using one or more projections (e.g., spherical projections, such as equirectangular projection, equiangular cubemap projection, stereographic projection). In some implementation, one or more cropping may be applied to include partial spherical visual content (less than 360 degrees of capture, less than 360 degrees field of view) within the output image(s) (e.g., panorama image(s)).

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible (non-transitory) machine-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, Li-Fi communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented (106) The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or as removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
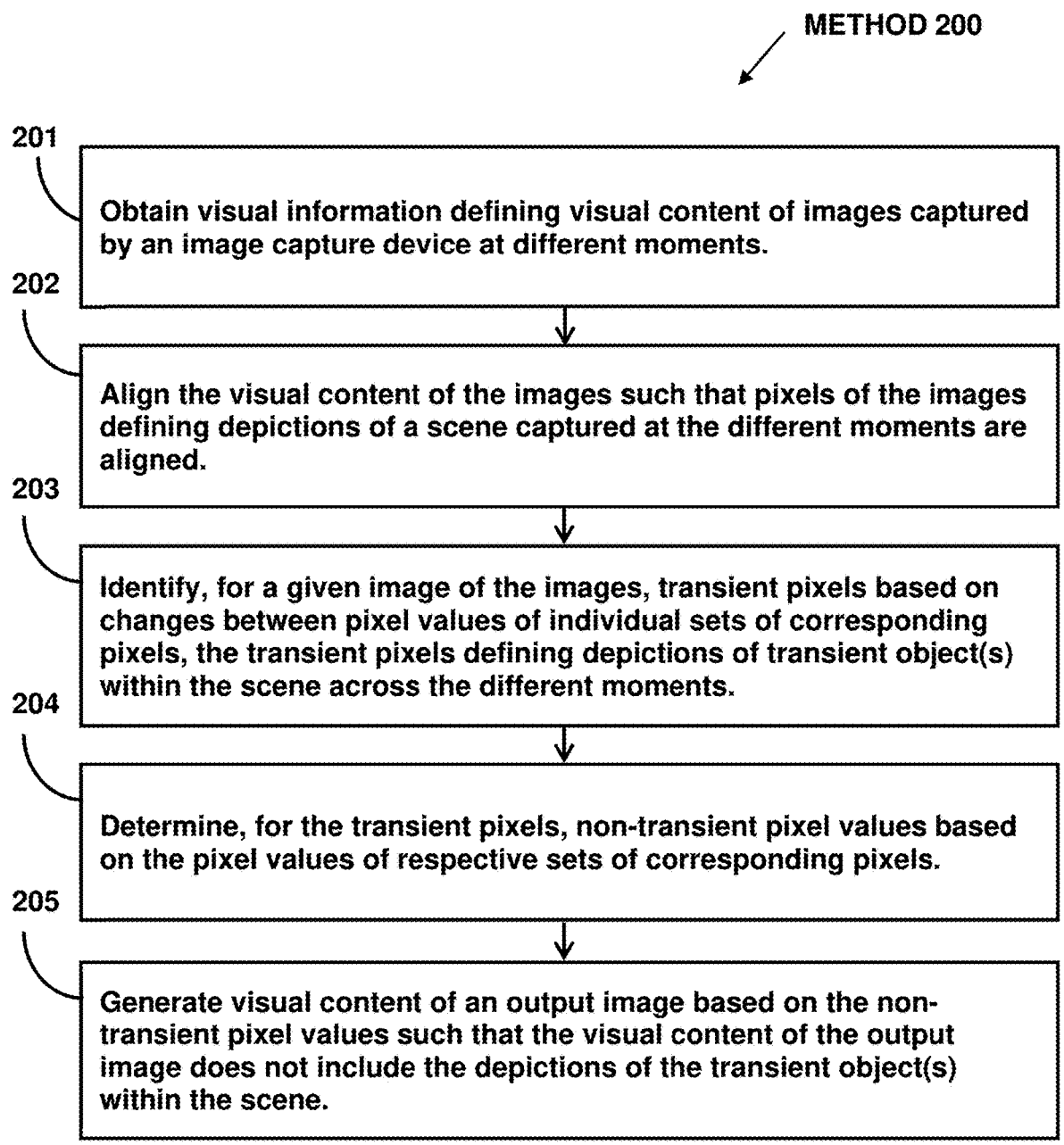
FIG. 2 illustrates an example method for removing transient elements in images.

FIG. 2 illustrates method 200 for removing transient elements in images. The operations of method 200 presented below are intended to be illustrative. In some implementations, method 200 may be accomplished with one or more additional operations not described, and/or without one or more of the operations discussed. In some implementations, two or more of the operations may occur substantially simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage media. The one or more processing devices may include one or more devices configured through hardware, firmware, and/or software to be specifically designed for execution of one or more of the operations of method 200.

Referring to FIG. 2 and method 200, at operation 201, visual information may be obtained. The visual information may define visual content of images captured by an image capture device at different moments. The visual content may include depictions of a scene captured at the different moments. The depictions of the scene may be defined by pixels of the images. The images may include a first image, a second image, a third image, and/or other images. The visual content of the first image may be captured at a first moment and may include a first depiction of the scene defined by pixels of the first image. The visual content of the second image may be captured at a second moment and may include a second depiction of the scene defined by pixels of the second image. The visual content of the third image may be captured at a third moment and may include a third depiction of the scene defined by pixels of the third image. In some implementation, operation 201 may be performed by a processor component the same as or similar to the visual information component 102 (Shown in FIG. 1 and described herein).

At operation 202, the visual content of the images may be aligned such that the pixels of the images defining the depictions of the scene captured at the different moments are aligned. The aligned pixels of the images may include sets of corresponding pixels across the images that define depictions of same parts of the scene. The sets of corresponding pixels may include a first set of corresponding pixels across the first image, the second image, and the third image that define depictions of a first part the scene. The first set of corresponding pixels may include a first pixel of the first image, a second pixel of the second image, and a third pixel of the third image. In some implementation, operation 202 may be performed by a processor component the same as or similar to the alignment component 104 (Shown in FIG. 1 and described herein).

At operation 203, for a given image of the images, transient pixels may be identified based on changes between pixel values of individual sets of corresponding pixels and/or other information. The transient pixels may define depictions of one or more transient objects within the scene across the different moments. A first transient pixel may be identified based on changes between pixel values of the first pixel of the first image, the second pixel of the second image, and the third pixel of the third image, and/or other information. In some implementation, operation 203 may be performed by a processor component the same as or similar to the transient pixel component 106 (Shown in FIG. 1 and described herein).

At operation 204, for the transient pixels, non-transient pixel values may be determined based on the pixel values of respective sets of corresponding pixels and/or other information. In some implementation, operation 204 may be performed by a processor component the same as or similar to the non-transient pixel value component 108 (Shown in FIG. 1 and described herein).

At operation 205, visual content of an output image may be generated based on the non-transient pixel values such that the visual content of the output image does not include the depictions of the one or more transient objects within the scene. In some implementation, operation 205 may be performed by a processor component the same as or similar to the generation component 110 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for removing transient elements in images, the system comprising:
one or more physical processors configured by machine-readable instructions to:
obtain visual information defining visual content of images captured by an image capture device at different moments, the visual content including depictions of a scene captured at the different moments, the depictions of the scene defined by pixels of the images, wherein the images include a first image, a second image, and a third image, the visual content of the first image captured at a first moment and including a first depiction of the scene defined by pixels of the first image, the visual content of the second image captured at a second moment and including a second depiction of the scene defined by pixels of the second image, and the visual content of the third image captured at a third moment and including a third depiction of the scene defined by pixels of the third image;
align the visual content of the images such that the pixels of the images defining the depictions of the scene captured at the different moments are aligned, the aligned pixels of the images including sets of corresponding pixels across the images that define depictions of same parts of the scene, the sets of corresponding pixels including a first set of corresponding pixels across the first image, the second image, and the third image that define depictions of a first part the scene, the first set of corresponding pixels including a first pixel of the first image, a second pixel of the second image, and a third pixel of the third image;
identify, for a given image of the images, transient pixels based on changes between pixel values of individual sets of corresponding pixels, the transient pixels defining depictions of one or more transient objects within the scene across the different moments, wherein a first transient pixel is identified based on changes between pixel values of the first pixel of the first image, the second pixel of the second image, and the third pixel of the third image;
determine, for the transient pixels, non-transient pixel values based on the pixel values of respective sets of corresponding pixels; and
generate visual content of an output image based on the non-transient pixel values such that the visual content of the output image does not include the depictions of the one or more transient objects within the scene.

2. The system of claim 1, wherein the images are video frames of an input video and the output image is a video frame of an output video.

3. The system of claim 1, wherein:
the images are captured during a capture duration by the image capture device;
the image capture device experiences rotational movement during the capture duration;
aligning the visual content of the images includes aligning overlapping portions of the visual content of the images; and
a lateral portion of the visual content of the first image overlaps with an opposing lateral portion of the visual content of the second image.

4. The system of claim 3, wherein the rotational movement is caused by jittering of the image capture device during the capture duration.

5. The system of claim 3, wherein the rotational movement is caused by panning of the image capture device during the capture duration.

6. The system of claim 5, wherein the images are stitched to form a panoramic image.

7. The system of claim 1, wherein:
the images are captured during a capture duration by the image capture device;
the image capture device experiences translational movement during the capture duration;
aligning the visual content of the images includes aligning overlapping portions of the visual content of the images; and
a center portion of the visual content of the first image overlaps with a center portion of the visual content of the second image.

8. The system of claim 7, wherein the center portion of the visual content of the first image is smaller than the center portion of the visual content of the second image, and the center portion of the visual content of the first image or the center portion of the visual content of the second image is warped to compensate for the center portion of the visual content of the first image being smaller than the center portion of the visual content of the second image.

9. The system of claim 1, wherein identification of the transient pixels based on the changes between the pixel values of the individual sets of corresponding pixels includes identification of the first transient pixel based on the changes between pixel values of the first pixel of the first image, the second pixel of the second image, and the third pixel of the third image exceeding a threshold value.

10. The system of claim 1, wherein the non-transient pixel values are determined as medians of the pixel values of the respective sets of corresponding pixels.

11. A method for removing transient elements in images, the method performed by a computing system including one or more processors, the method comprising:
obtaining, by the computing system, visual information defining visual content of images captured by an image capture device at different moments, the visual content including depictions of a scene captured at the different moments, the depictions of the scene defined by pixels of the images, wherein the images include a first image, a second image, and a third image, the visual content of the first image captured at a first moment and including a first depiction of the scene defined by pixels of the first image, the visual content of the second image captured at a second moment and including a second depiction of the scene defined by pixels of the second image, and the visual content of the third image captured at a third moment and including a third depiction of the scene defined by pixels of the third image;
aligning, by the computing system, the visual content of the images such that the pixels of the images defining the depictions of the scene captured at the different moments are aligned, the aligned pixels of the images including sets of corresponding pixels across the images that define depictions of same parts of the scene, the sets of corresponding pixels including a first set of corresponding pixels across the first image, the second image, and the third image that define depictions of a first part the scene, the first set of corresponding pixels including a first pixel of the first image, a second pixel of the second image, and a third pixel of the third image;
identifying, by the computing system and for a given image of the images, transient pixels based on changes between pixel values of individual sets of corresponding pixels, the transient pixels defining depictions of one or more transient objects within the scene across the different moments, wherein a first transient pixel is identified based on changes between pixel values of the first pixel of the first image, the second pixel of the second image, and the third pixel of the third image;
determining, by the computing system and for the transient pixels, non-transient pixel values based on the pixel values of respective sets of corresponding pixels; and
generating, by the computing system, visual content of an output image based on the non-transient pixel values such that the visual content of the output image does not include the depictions of the one or more transient objects within the scene.

12. The method of claim 11, wherein the images are video frames of an input video and the output image is a video frame of an output video.

13. The method of claim 11, wherein:
the images are captured during a capture duration by the image capture device;
the image capture device experiences rotational movement during the capture duration;
aligning the visual content of the images includes aligning overlapping portions of the visual content of the images; and
a lateral portion of the visual content of the first image overlaps with an opposing lateral portion of the visual content of the second image.

14. The method of claim 13, wherein the rotational movement is caused by jittering of the image capture device during the capture duration.

15. The method of claim 13, wherein the rotational movement is caused by panning of the image capture device during the capture duration.

16. The method of claim 15, wherein the images are stitched to form a panoramic image.

17. The method of claim 11, wherein:
the images are captured during a capture duration by the image capture device;
the image capture device experiences translational movement during the capture duration;
aligning the visual content of the images includes aligning overlapping portions of the visual content of the images; and a center portion of the visual content of the first image overlaps with a center portion of the visual content of the second image.

18. The method of claim 17, wherein the center portion of the visual content of the first image is smaller than the center portion of the visual content of the second image, and the center portion of the visual content of the first image or the center portion of the visual content of the second image is warped to compensate for the center portion of the visual content of the first image being smaller than the center portion of the visual content of the second image.

19. The method of claim 11, wherein identification of the transient pixels based on the changes between the pixel values of the individual sets of corresponding pixels includes identification of the first transient pixel based on the changes between pixel values of the first pixel of the first image, the second pixel of the second image, and the third pixel of the third image exceeding a threshold value.

20. The method of claim 11, wherein the non-transient pixel values are determined as medians of the pixel values of the respective sets of corresponding pixels.

* * * * *